Figure 2:
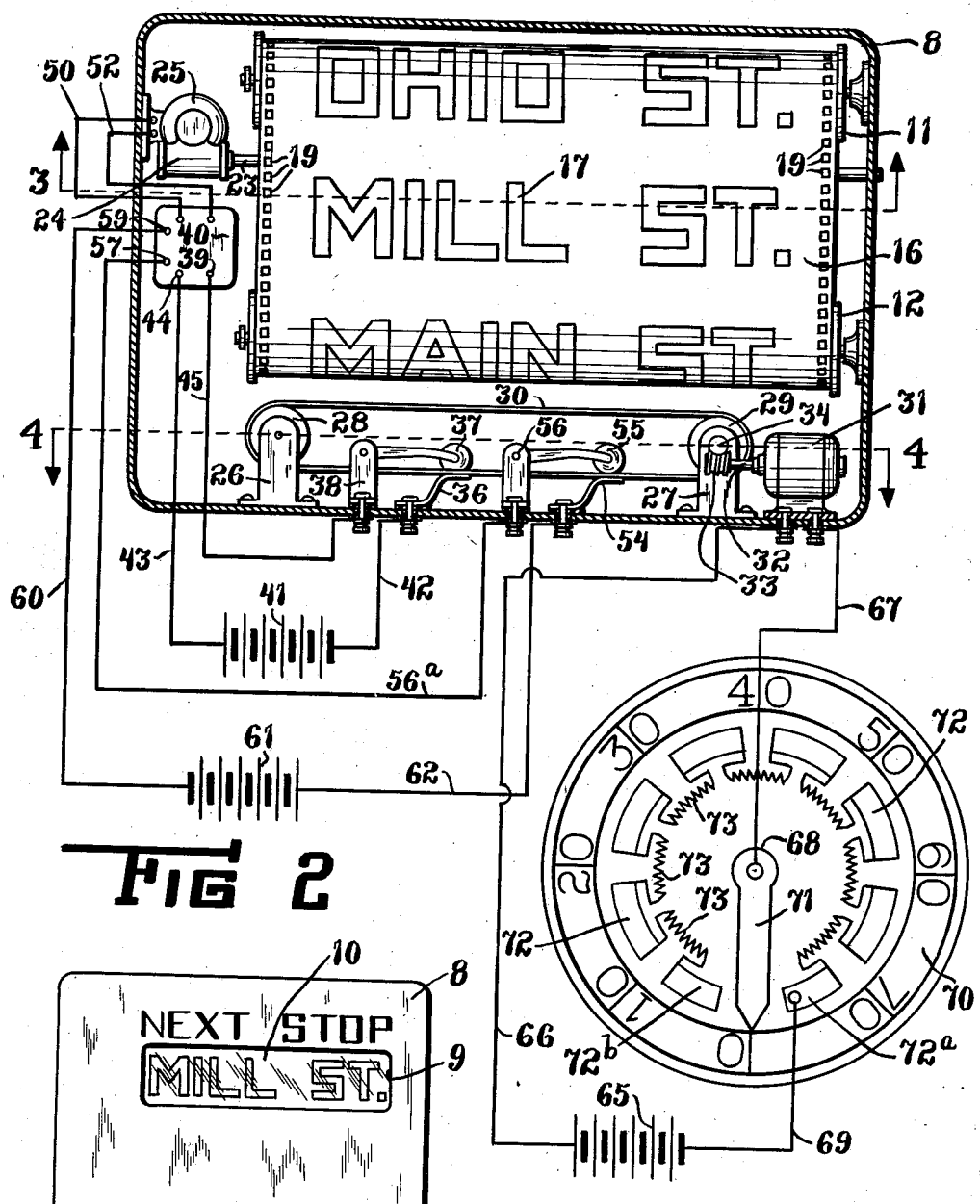

June 8, 1937.  A. C. HURT  2,083,230
STOP INDICATOR FOR VEHICLES
Filed Aug. 12, 1936   2 Sheets-Sheet 1

ANTON C HURT
INVENTOR
BY *F. E. Shannon*
ATTORNEY

June 8, 1937.  A. C. HURT  2,083,230
STOP INDICATOR FOR VEHICLES
Filed Aug. 12, 1936   2 Sheets-Sheet 2

ANTON C HURT
INVENTOR
BY
ATTORNEY

Patented June 8, 1937

2,083,230

UNITED STATES PATENT OFFICE 2,083,230

STOP INDICATOR FOR VEHICLES

Anton C. Hurt, Akron, Ohio

Application August 12, 1936, Serial No. 95,558

5 Claims. (Cl. 40—53)

This invention relates to improvements in stop indicating devices and is particularly adapted for use on passenger carrying vehicles to automatically indicate the position of the vehicle on the route being traveled.

Objects of the invention are to provide a stop indicator of simple, durable construction which may be conveniently installed on a vehicle and operatively connected to a speedometer or other device driven by a moving part of the vehicle and which will operate automatically to display the name of the street, station or other stop, in advance and which will be very accurate and reliable in use.

The above and additional objects and advantages are accomplished by the novel construction, combination and arrangement of parts hereinafter described with reference to the accompanying drawings in which there is shown an illustrative embodiment of the invention, it being understood that changes and modifications may be made or resort had to substitutions and equivalents which come within the scope of the claims hereunto appended.

In the drawings:—

Figure 1:
Figure 3:
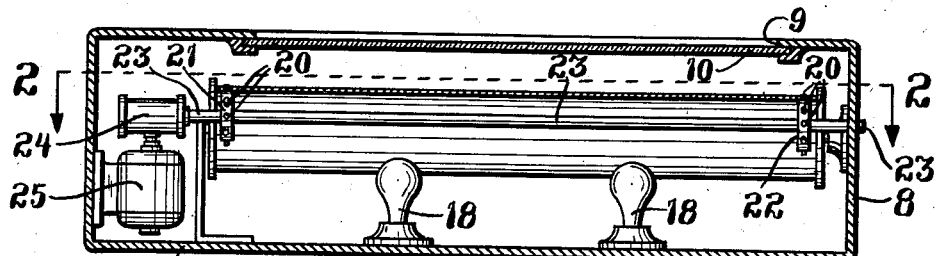
Figure 4:
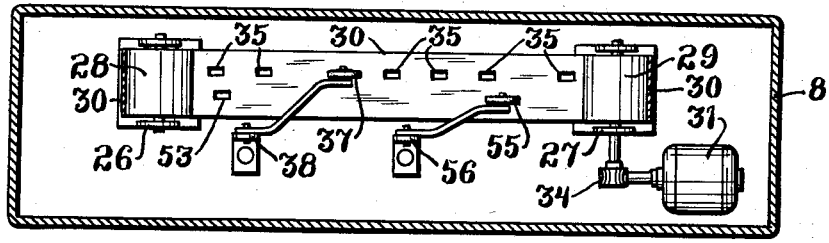
Figure 5:
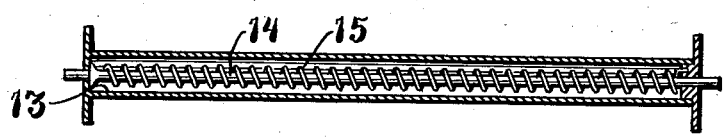
Figure 6:
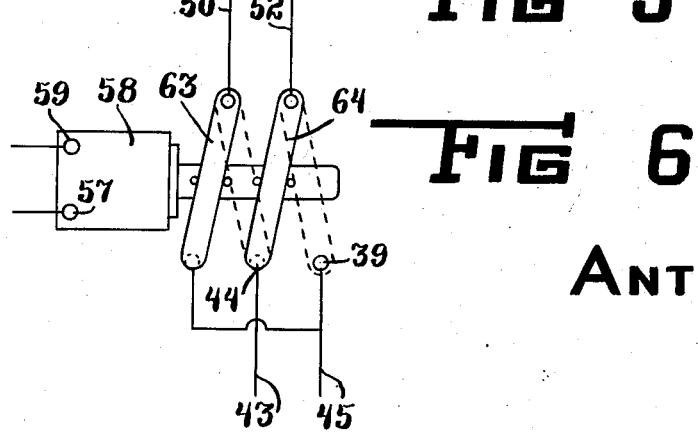

Figure 1 is a front, elevational view of a stop indicator constructed in accordance with this invention, Figure 2 is a vertical, cross sectional view partly diagrammatic in character with the sectional portions thereof taken as indicated by the lines 2—2 of Figure 3, Figure 3 is a horizontal, sectional view taken as indicated by the lines 3—3 of Figure 2, Figure 4 is a horizontal, sectional view taken as indicated by the lines 4—4 of Figure 2, Figure 5 is a central, longitudinal, sectional view of one of the rollers employed in the particular adaptation of the invention illustrated, Figure 6 is a diagrammatic view of one of the parts employed in the illustrated adaptation of the invention.

Proceeding now to a detailed description of the invention with reference to the particular adaptation of the invention illustrated in the drawings, the numeral 8 denotes a casing which may be of any suitable construction and which is adapted to be mounted in a passenger carrying vehicle at a point where it can be conveniently seen. The casing 8 is provided with the window 9 which is preferably closed with a transparent panel 10.

The numerals 11 and 12 denote rollers which are rotatably mounted in parallel spaced relation within the casing 8. The rollers 11 and 12 are of the well known shade roller type, each being provided with an axial bore 13, an axially arranged shaft 14 and a coil spring 15 which is mounted on the said shaft with one end thereof secured to the shaft and the other end thereof to the roller. The springs 15 in the rollers 11 and 12 are oppositely positioned on the shaft 14 whereby the same may be wound to drive the said rollers in opposite directions.

The numeral 16 denotes a strip of flexible sheet material having one end thereof secured to the roller 11 and the other end thereof to the roller 12. The strip 16 is preferably composed of translucent material and is wound on said rollers so as to extend between the forwardly presented sides thereof. The springs 15 and the rollers 11 and 12 being wound as herein set forth maintain the strip 16 in a taut condition. The strip 16 is provided with a plurality of laterally disposed, equally spaced sets of characters 17, each set designating a stop or location on the route to be traveled.

It will be seen that the intermediate portion of the strip 16 is thus presented to the window 9 whereby the strip may be fed from one roller to the other to successively present each set of characters 17 to said window.

The numeral 18 denotes electric lamps which are suitably mounted on the rear wall of the casing 8 and which may be operated to illuminate the strip 16. The strip 16 is provided adjacent each edge thereof with a longitudinally extending row of equally spaced apertures 19 which are adapted to receive the pins 20 on the driving wheels 21 and 22. The wheels 21 and 22 are fixedly secured to the horizontal shaft 23 which is disposed laterally of the casing and rotatably mounted therein as shown in Figure 3.

In the particular adaptation of the invention illustrated, one end of the shaft 23 is directly connected to a speed reduction unit 24 which is operatively connected to an electric motor 25. The speed reduction unit 24 may be of any suitable construction and the motor 25 is reversible whereby it may be driven to operate the shaft 23 in either direction.

The numerals 26 and 27 denote brackets which are secured to the lower wall of the casing 8. An idler sheave 28 is operatively mounted on the bracket 26 and a drive wheel 29 is rotatably mounted on the bracket 27. The numeral 30 denotes an endless, flexible belt which is operatively mounted on the pulleys 28 and 29 so as to extend therebetween. The numeral 31 denotes an electric motor which is positioned in the casing 8 to drive the pulley 29 thus imparting a longitudinal movement to the belt 30. While any suitable driving connection may be employed, in the drawings there is shown a driving shaft 32 having a worm 33 which is in mesh with a wheel 34 fixed to the shaft of the pulley 29. The strip 30 is composed of electrically, non-conductive material and is provided with a row of apertures 35 which are preferably of the same size and which are disposed therein in a row extending longitudinally thereof. The apertures 35 in the strip 30 are spaced to correspond to the distances between the stops on the route to be traveled.

The numeral 36 denotes a spring contact which is positioned on one side of the strip 30 and the numeral 37 denotes a roller contact member which is positioned on the other side of the strip at a point directly opposite the spring contact members 6.

The roller 37 and the contact member 36 are positioned in the vertical plane of the openings 35. The roller contacting member 37 is operatively secured to the bracket 38 and the bracket 38 is connected to the terminal 39 by a conductor wire 45 on the reversing switch 40. A spring contacting member 36 is likewise connected to a battery 41 or other source of electricity by means of a conductor 42. The other terminal of the battery 41 is connected by the conductor 43 to the terminal 44 on the reversing switch 40. The wires 50 and 52 operatively connect the switch 40 to the electric motor 25.

The strip 30 is provided adjacent one side thereof with an aperture 53 and a contact member 54 is positioned beneath the strip 30 and disposed in the path of the aperture 53. The contact roller 55 is operatively mounted on the bracket 56 directly above the contact spring 54 whereby the belt 30 may be driven to bring the aperture 38 between the heads 54 and 55 to complete the circuit hereinafter described. A conductor wire 56ª is operatively connected to the bracket 56 with the other end thereof connected to the terminal 57 on the solenoid 58.

The other terminal 59 of the solenoid 58 is connected by the conductor 60 to the battery 61 which in turn is connected by means of the conductor 62 to the contact spring 54. It will be seen that with the motor 31 operating in one direction the belt 30 will be driven until the heads 55 and 54 are in contact at the aperture 53 thus completing an electric circuit which operates the solenoid 58 to move the switch blades 63 and 64 as indicated by the dotted lines in Figure 6 thereby reversing the motor 25 and driving the strip 16 in an opposite direction.

One terminal of the motor 31 is connected to the battery 65 or other source of electrical energy by the conductor wire 66 and the other terminal thereof is connected to the battery 65 by the conductor wire 67, the rheostat 68 and the conductor wire 69. The rheostat 68 is operated by a speed indicating device which may be of any suitable construction. In the drawings, there is shown a speedometer dial with an indicator hand 71 which is connected to the conductor wire 67. The hand 71 is arranged to contact with the blocks 72 which are spaced around the dial 70 with a resistance element 73 interposed between each block 72 and the adjacent block. The conductor wire 69 is connected to the block 72a which is positioned to be contacted by the hand 71 when the vehicle has reached its maximum speed and the blocks 72a and 72b are disconnected and spaced apart so that the speedometer hand 71 will not contact with any of said blocks when the vehicle is not in operation. When the vehicle is not in motion, the hand 71 is out of contact with the blocks 72 and the circuit of the motor 31 is open.

When the vehicle is moved slowly, the hand 71 contacts with the block 72 thus interposing all of the resistance units 73 in circuit, thus reducing the speed of the motor 31. As the vehicle is driven faster the hand 71 is moved to successively contact with a block 72 adjacent the character which indicates the speed of the vehicle. As the speed increases, the number of resistance units 73 decreases thereby increasing the speed of the motor 31 and providing accurate means for driving the belt 30 in accordance with the speed of the vehicle. As the belt 30 is thus driven by the motor 31 the apertures 35 are moved to permit brief successive contact of the members 36 and 37 thus operating the motor 25 and causing the strip 16 to move to present the succeeding set of reference characters 17 to the window 9.

When the vehicle reaches the end of the line the opening 53 permits contact of the members 54 and 55 thus reversing the motor 25 and driving the strip 16 in the opposite direction.

Having thus illustrated my invention and described the same in detail, what I claim as new and desire to secure by Letters Patent is:—

1. In a device of the character described, a casing having a window; spools mounted in spaced relation in said casing, a strip of sheet material operatively mounted on said spools with the intervening portion thereof visible through said window, characters on said strip, said characters designating stops, on the route to be traveled; means to maintain said strip in a taut condition between said spools; an electric motor for feeding said strip from one spool to the other, an electric circuit for said motor, circuit making and breaking means operatively interposed in said circuit, said circuit making and breaking means comprising an endless key strip having a longitudinally extending series of openings arranged to correspond with the stops designated; a second electric motor for driving said key strip, an electric circuit for said electric motor; a rheostat operatively interposed in the last named circuit and means controlled by the speed of the vehicle for operating said rheostat.

2. In a stop indicating device for a vehicle, a casing having a window, spools mounted in spaced relation in said casing, a strip of sheet material operatively mounted on said spools with the intervening portion thereof visible through said window, characters on said strip said characters indicating points on the route over which the vehicle is to be driven; means to maintain said strip in a taut condition between said spools; electrically operated means directly engaging the strip for feeding the same from one spool to the other; an electric circuit for said feeding means; circuit making and breaking means operatively interposed in said circuit, said circuit making and breaking means comprising an endless key strip of sheet material having a longitudinally extending series of openings arranged to correspond with points on the route to be traveled, an electric motor for driving said key strip, an electric circuit for said electric motor, a rheostat operatively interposed in the last named circuit for varying the speed of said motor and speed indicating means for operating said rheostat.

3. In a stop indicating device for a vehicle, a casing having a window, spools mounted in spaced relation in said casing, a strip of sheet material operatively mounted on said spools with the intervening portions thereof visible through said window, characters on said strip, said characters indicating stops on the route to be traveled; electrically controlled means for feeding said strip from one spool to the other; an electric circuit for said feeding means, circuit making and breaking means operatively interposed in said circuit, said circuit making and breaking means including contacting members, a separator strip of dielectric sheet material interposed between said contacting members, said separator strip having a series of openings arranged to correspond with the characters indicated on the strip of sheet material, an electric motor for driving said sheet material to successively bring said contacting members into engagement with said openings, an electric circuit for said motor, a rheostat operatively interposed in the last named circuit and means controlled by the speedometer of a vehicle for operating said rheostat.

4. In a stop indicator for a vehicle, a casing having a window, a strip of flexible sheet material therein; a longitudinally extending series of sets of characters thereon, each set of characters indicating a location on the route over which the vehicle is to be driven, means to intermittently drive said strip to successively present each of said sets of characters to said window and means controlled by the speed of the vehicle for regulating said driving means.

5. In a stop indicator for a vehicle, an elongated strip of flexible sheet material having a longitudinally extending series of spaced sets of characters thereon, said sets of characters indicating stops on the route over which the vehicle is to be driven; electrically operated driving means for intermittently moving said strip to successively display each set of characters, an electric circuit for said driving means and means controlled by the speed of the vehicle for closing said circuit at predetermined intervals.

ANTON C. HURT.